Patented July 9, 1946

2,403,473

UNITED STATES PATENT OFFICE 2,403,473

THERAPEUTIC COMPOSITIONS

Stefan Ansbacher, Rockville Centre, N. Y., assignor to American Home Products Corporation, New York, N. Y., a corporation of Delaware No Drawing. Application October 21, 1944, Serial No. 559,827

4 Claims. (Cl. 167—65)

This invention relates to therapeutic compositions in which the active ingredient is para-aminobenzoic acid. It will be understood that the term "para-aminobenzoic" acid is intended to include water-soluble salts thereof such as sodium para-aminobenzoate, calcium para-aminobenzoate, ammonium para-aminobenzoate and para-aminobenzoic acid hydrochloride. This application is a continuation-in-part of my co-pending patent application Serial No. 378,559 filed February 12, 1941.

Para-aminobenzoic acid was first prepared by G. Fischer in 1863 (Annalen, volume 127, page 142) by reduction of para-nitrobenzoic acid with ammonium sulfide. Up to the time of the present invention, however, there seems to have been no direct application of para-aminobenzoic acid as a medicament for human beings, the main use of the substance having been as a dye intermediate and as a starting material for the preparation of local anesthetics, such as para-amino benzoyl diethylamino-ethanol. Since my publication of the effect of para-aminobenzoic acid in preventing gray hair in rats in 1941 (Science, volume 93, page 164) and since the later publication of the success accomplished in treating human achromotrichia with para-aminobenzoic acid, further investigations have been carried out from the standpoint of the treatment of certain syndromes frequently occurring in the human being. These syndromes comprise achromotrichia with or without disorders related or not related to it, such as, for instance, endocrine, gastro-intestinal disorders, etc. In some cases, it may be necessary to institute proper therapy for the concurrent disorders before achromotrichial effects of para-aminobenzoic acid become evident. In other cases, it may be possible to influence the concurrent disorders solely by the administration of para-amonibenzoic acid or by para-aminobenzoic acid in combination with the therapeutic agents commonly used in the treatment of such disorders.

The publications referred to above also stimulated investigations as to the amount of para-aminobenzoic acid inherently present in natural sources of the vitamin B complex. It has subsequently been shown that natural vitamin B complex products contain para-aminobenzoic acid in extremely small amounts. To date, only one sample of yeast has been found to contain as much as 0.016% of para-aminobenzoic acid, and this particular sample of yeast is about five times higher in para-aminobenzoic acid than most other yeasts. Another vitamin B complex product is liver, the para-aminobenzoic acid content of which is at least ten times lower than that of yeast. The low amount of para-aminobenzoic acid inherently present in natural vitamin B complex materials is insufficient to influence beneficially achromotrichia and other syndromes which respond to medication with para-aminobenzoic acid compositions of the present invention.

One object of the present invention is to provide para-aminobenzoic acid compositions for use in human therapy. Another object of the invention is to furnish a remedial composition for the clinical treatment of syndromes such as achromotrichia, endocrine disturbances, gastrointestinal disorders, which compositions may contain other therapeutically active ingredients such as B-vitamins and/or natural or synthetic compounds with endocrine activity.

According to my invention, a therapeutic composition is prepared in which para-aminobenzoic acid is the predominant and primary active medicament and is contained in a solid substantially non-toxic medicinal carrier such as lactose, starch, sugar and dextrin together with other inert excipients used in the preparation of tablets, such as stearic acid, magnesium stearate, gelatin and acacia. Preferably, however, the solid medicinal carrier is a vitamin B complex material, the vitamin B complex material being yeast, liver or cereals, or mixtures thereof, or mixtures of synthetic vitamin materials, such as thiamine hydrochloride, riboflavin, nicotinic acid or its amide, with or without addition of the other B-vitamins, such as pyridoxine hydrochloride, calcium pantothenate and inositol, or synthetic vitamin mixtures in the proportions found in natural vitamin B complex products. In any case, however, the para-aminobenzoic acid is added in sufficient amount to constitute the chief therapeutic ingredient, as for instance in tablets or capsules containing about 50 mg. to about 1 g. of para-aminobenzoic acid.

The chromotrichial efficacy of para-aminobenzoic acid upon animals is shown by the following experiment. One hundred black or piebald rats at weaning age, were placed on a basal ration consisting of

| Ingredient | Parts by weight |
|---|---|
| Carbohydrate (for example Cerelose) | 70 |
| Vitamin-free casein | 18 |
| Salts | 4 |
| Agar | 2 |
| Soy bean oil | 2 |
| Hydrogenated vegetable oil (for example Crisco) | 2 |
| Cod liver oil | 2 | and given a daily supplement of 0.5 ml. of a 20% ethanol solution containing per ml.:

| | | |
|---|---|---|
| Thiamine hydrochloride | micrograms | 80 |
| Riboflavin | do | 80 |
| Pyrodoxine hydrochloride | do | 80 |
| Calcium pantothenate | milligrams | 1 |
| Nicotinamide | do | 1 |
| Inositol | do | 1 |
| Choline chloride | do | 6 |

When typical symptoms of achromotrichia had appeared, seventy of the rats were given an additional daily supplement of 1 ml. of a 20% ethanol solution containing 3 mg./ml. of para-aminobenzoic acid. A bluish discoloration of the skin (a typical first sign of the normally pigmented hair) appeared in 2-3 weeks and jet black hair within a month. The thirty controlled animals in receiving the para-aminobenzoic acid continued to show typical nutritional achromotrichia.

Tablets consisting of 100 mg. of para-aminobenzoic acid and a suitable amount of lactose have been administered clinically to numerous patients suffering from achromotrichia in doses ranging from 50 mg. to a maximum of 600 mg. per day over periods of as long as two years and nine months. Stoppage of further graying and a partial and complete return of the normal color of the hair has been reported for a fairly large number of the cases so treated. Thus, Dr. Benjamin F. Sieve has reported in 1943 in the Medical World, volume 62, pages 251-3, positive results in the pigmentation of 82% of 460 patients of both sexes treated for achromotrichia with the para-aminobenzoic acid tablets of the invention.

It is not known whether para-aminobenzoic acid is to be classified among the vitamins or among some other therapeutically active agent. It is possible that para-aminobenzoic acid is effective by altering the bacterial flora within the gastro-intestinal tract. It is known that patients with constipation are relieved by the ingestion of para-aminobenzoic acid in amounts of 100 mg., three to five times a day in the form of chocolate coated tablets of the composition of the invention, or in oil emulsions, for instance mineral oil, or any other media frequently employed in the therapy or prophylaxis of constipation with the aim of reducing the usual laxative dose by the simultaneous administration of para-aminobenzoic acid.

It is also possible that para-aminobenzoic acid acts by altering enzymatic processes occurring in the organism either by acting as a co-enzyme or by retarding certain enzymatic systems while accelerating others. Thereby, the metabolism may be affected in such a manner that para-aminobenzoic acid in the form of the composition of the invention influences endocrine dyscrasias. Asthmatics, for example, are benefited by para-aminobenzoic acid in the form of the composition of the invention when taken during the periods of remission, and when taken in conjunction with the usually employed remedies such as adrenalin or epinephrine during the attacks, thereby reducing the usual dose of the drug required.

It is also possible that para-aminobenzoic acid acts by way of stimulation or inhibition of some of the endocrine glands, such as sex glands, adrenals, pituitary or thyroid glands. Thus, para-aminobenzoic acid by itself, favorably influences abnormal basal metabolic rates such as in thyrotoxicosis, either in the form of the composition of the invention when taken in doses of 100 to 200 mg. three to five times daily or when taken in conjunction with substances usually administered for the treatment of disturbed metabolism, thereby reducing the usual dose of the drugs required. Thus, for instance, steroid hormones are potentiated by the simultaneous administration of the para-aminobenzoic compositions of the invention.

I claim:

1. A therapeutic composition in dosage-unit form comprising a carrier of the solid type and as the added active medicament not less than about 50 milligrams per dosage unit of a compound of the group consisting of para-aminobenzoic acid and water-soluble salts thereof.

2. A therapeutic composition in dosage-unit form comprising a carrier consisting of the vitamin B complex and as the added active medicament from about 50 milligrams to about 1 gram per dosage unit of a compound of the group consisting of para-aminobenzoic acid and water-soluble salts thereof.

3. A therapeutic composition in dosage-unit form comprising a carbohydrate and as the added active medicament from about 50 milligrams to about 1 gram per dosage unit of a compound of the group consisting of para-aminobenzoic acid and water-soluble salts thereof.

4. A therapeutic composition in dosage-unit form comprising a carrier of the solid type and from about 50 milligrams to about 1.0 gram per dosage unit of a compound of the group consisting of para-aminobenzoic acid and water-soluble salts thereof.

STEFAN ANSBACHER.